UNITED STATES PATENT OFFICE.

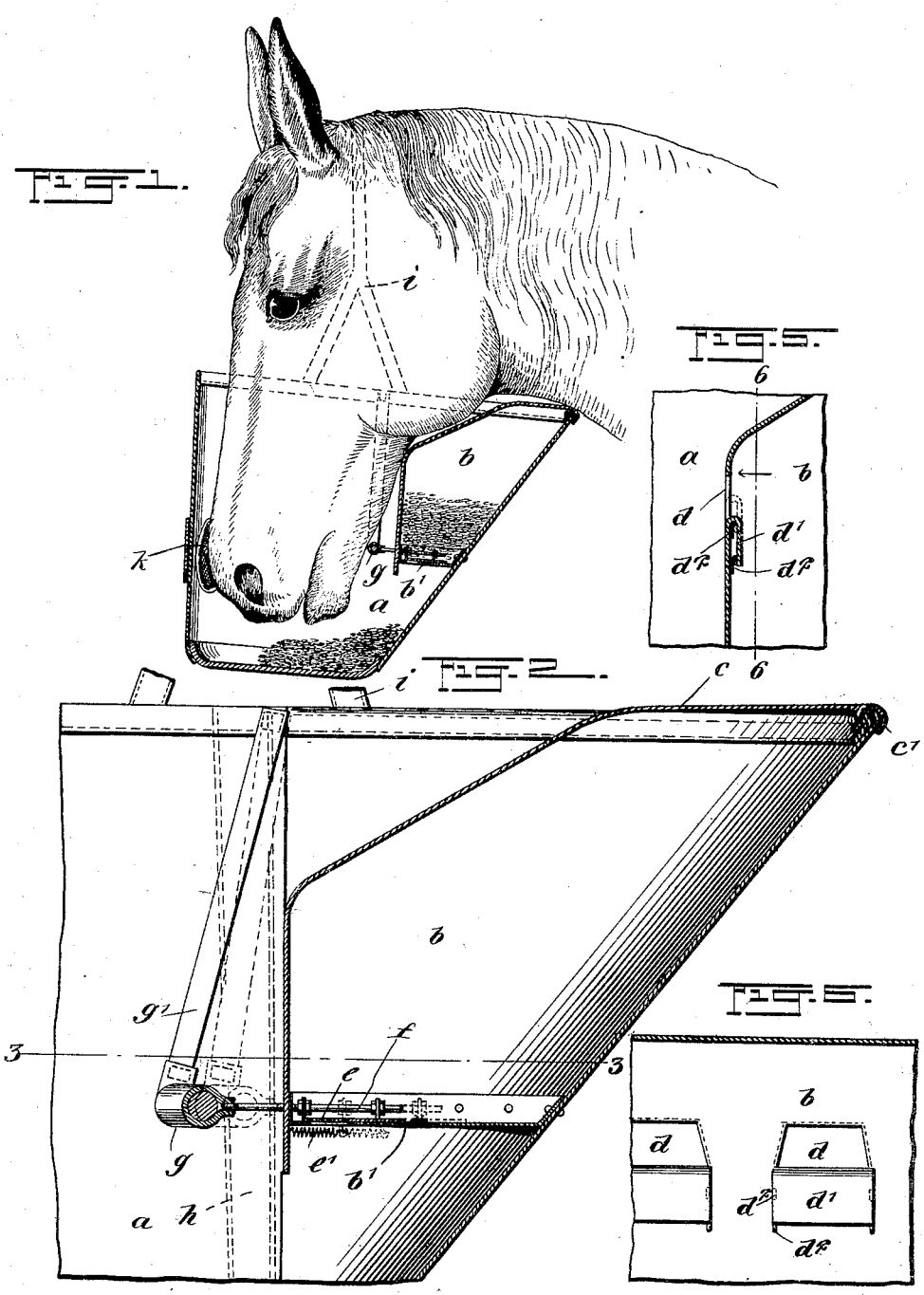

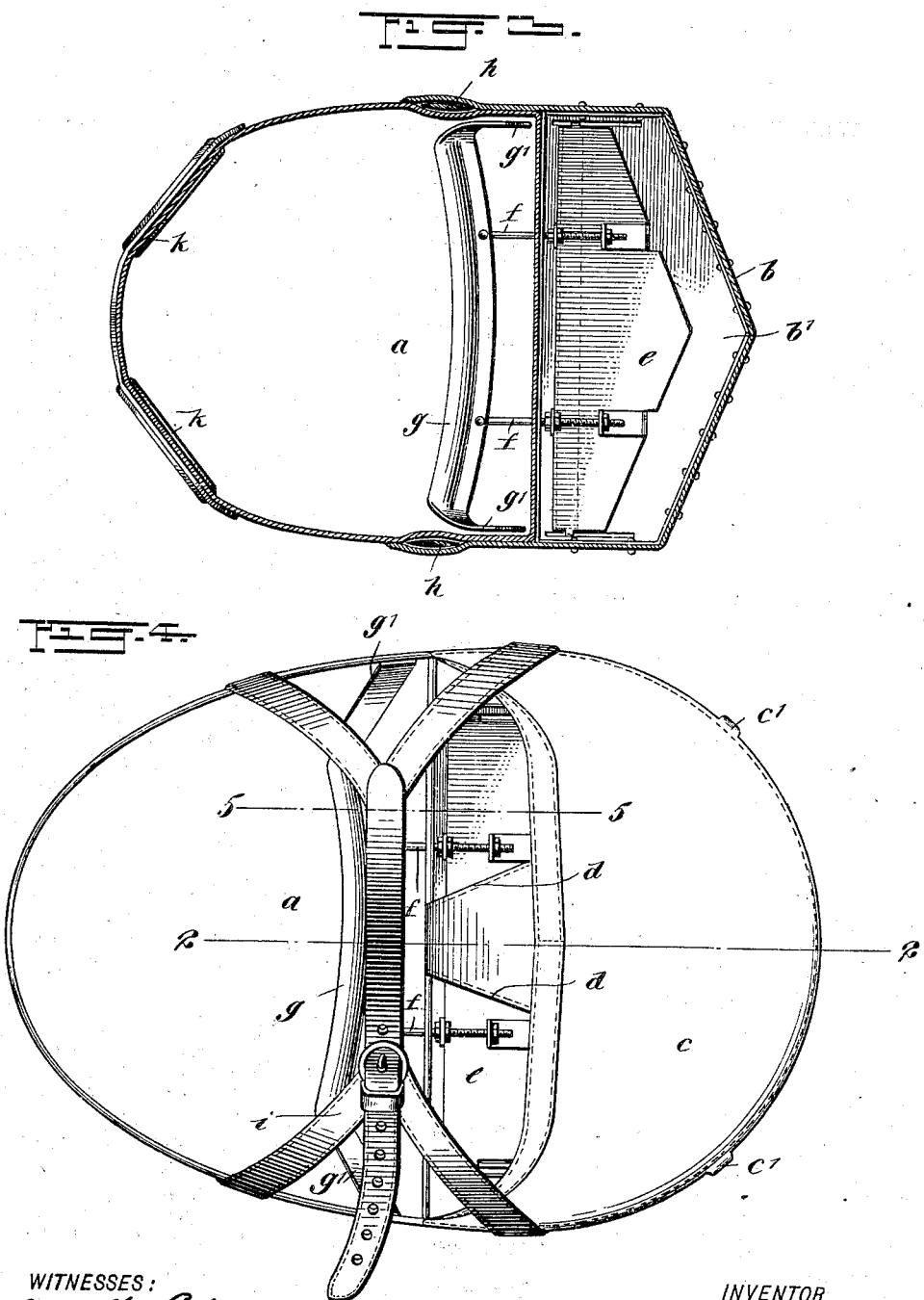

GEORGE L. DALE, OF NEW YORK, N. Y.

FEED-BAG.

SPECIFICATION forming part of Letters Patent No. 695,286, dated March 11, 1902.

Application filed November 9, 1901. Serial No. 81,652. (No model.)

*To all whom it may concern:*

Be it known that I, GEORGE L. DALE, a citizen of the United States, and a resident of the city of New York, borough of Manhattan, in the county and State of New York, have invented a new and Improved Feed-Bag, of which the following is a full, clear, and exact description.

This invention relates to a feed-bag of that class in which means are provided for controlling the supply of feed to the animal. By means of my invention a certain minor portion of the food to be given is immediately placed at the disposal of the animal using the bag, and then as the animal proceeds to move its jaw while feeding valve devices are operated, which serve gradually to deliver the rest of the feed. The result is that the animal eats slowly and thoroughly masticates the food. Further, the food being supplied gradually does not accumulate in a mass, such as will enable the horse when tossing its head to waste a part of the contents of the bag, but is delivered to the animal continually within easy reach mouthful after mouthful as required.

This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1 is a sectional view of the invention, showing it in use. Fig. 2 is an enlarged fragmentary section on the line 2 2 of Fig. 4. Fig. 3 is a cross-section on the line 3 3 of Fig. 2. Fig. 4 is a plan view of the invention. Fig. 5 is a section on the line 5 5 of Fig. 4, and Fig. 6 is a sectional elevation on the line 6 6 of Fig. 5.

The bag has a main part $a$ and at its upper rear portion a primary receptacle $b$, in which the feed is placed in the first instance. This receptacle $b$ is closed by a flap $c$, removably fastened at its free end by means of tabs $c'$ and suitable fastening devices. (Not shown.) At the upper part of the receptacle $b$ are formed openings $d$, which communicate with the main part $a$ of the bag. These openings are overflow-openings, as will be fully described hereinafter, and the height of their lower walls may be adjusted by means of flaps $d'$, which are mounted on the inner wall of the compartment $b$ and provided with adjustable fastening devices $d^2$, enabling them to be fastened in raised or lowered position, as desired. When the flaps are lowered, as in Fig. 5, they will permit a comparatively large quantity of food to pass out through the openings $d$; but when the flaps are raised up to the position shown by dotted lines in Fig. 5 a relatively small amount of feed will be permitted to pass the openings $d$.

The bottom of the compartment $b$ is formed, preferably, of a metal plate $b'$, which gives rigidity to the bag at this point, and this plate is formed with an opening leading down into the compartment $a$, such opening being commanded by a sliding valve $e$. The valve is mounted on top of the plate $d$ and is held normally closed by springs $e'$. Rods $f$ are adjustably connected to the valve by the nuts, as shown, and these rods extend forwardly through the front wall of the compartment $b$ and are joined to a transversely-extending jaw-bar $g$, arranged in front of the compartment $b$, and held to move back and forth by means of strips $g'$, fastened to the ends of the jaw-bar and to the sides of the bag, at the upper part thereof. These strips $g'$ may be formed of flexible or rigid material, as desired. They are preferably in the nature of straps, either of canvas or leather.

$h$ indicates strengthening-ribs which are fastened in the bag, at the sides thereof, and to the bag adjacent to these ribs is connected the sling-strap $i$ for supporting the bag on the horse's head.

$k$ indicates ventilators arranged in the front of the bag in the usual manner.

In using the invention the flaps $d'$ are set at the elevation desired, so that a greater or less amount of feed will pass out of the openings $d$. Then the flap or cover $c$ is raised and the entire amount of feed to be given to the horse or other animal is poured into the compartment $b$. A certain minor portion of this feed will overflow through the openings $d$ and fall into the main compartment $a$. The bag is now placed on the horse's head, and as the horse begins to eat the feed in the compartment $a$ the movement of the lower jaw of the horse will work back and forth the bar $g$.

This will operate the valve e, and the feed will be gradually fed from the compartment b into the compartment a. The horse will thus be forced to eat slowly, and the disadvantage of a great mass of feed being placed directly in the receptacle from which the horse eats is avoided.

Various changes in the form and details of my invention may be resorted to at will without departing from the spirit of my invention. Hence I consider myself entitled to all forms of the invention as may lie within the intent of my claims.

Having thus described my invention, I claim as new and desire to secure by Letters Patent—

1. A feed-bag, having two compartments with a passage from one to the other, one compartment being raised to permit the flow of food by gravity into the other compartment, a valve controlling said opening between the compartments, and an operating device connected with the valve, said operating device projecting from the valve to be engaged by the lower jaw of the animal, whereby to operate the valve from the motion of the animal's jaw in chewing.

2. A feed-bag having two compartments, one being raised above the other and the feed-bag having an opening leading from one compartment to the other, a valve controlling said opening, a spring pressing the valve yieldingly into closed position, and an operating device connected with the valve and projected forwardly into position to be engaged by the lower jaw of the animal, whereby to operate the valve upon the movement of the jaw in chewing.

3. A feed-bag, having an essentially vertical wall forming it into two compartments, one compartment having an opening in its bottom leading into the other compartment, and the said wall having an opening near its top adapted to permit the contents of the first-named compartment to overflow into the second compartment, and means for controlling the passage of the feed through the opening in the bottom of the first-named compartment.

4. A feed-bag, having an essentially vertical wall forming it into two compartments, one compartment having an opening in its bottom leading into the other compartment, and the said wall having an opening near its top adapted to permit the contents of the first-named compartment to overflow into the second compartment, means for controlling the passage of the feed through the opening in the bottom of the first-named compartment, said means comprising a valve, and an opening device projecting outwardly from the wall to be engaged by the animal, for the purpose specified.

5. A feed-bag, having two compartments with an opening leading from one to the other, a valve controlling said opening, a rod attached to the valve and projecting laterally, a jaw-bar attached to the rod, and strips of flexible material connected with the ends of the jaw-bar and with the walls of the feed-bag, whereby movably to mount the jaw-bar.

6. A feed-bag, having a wall forming two compartments, said wall having an overflow apparatus therein, a flexible flap arranged adjacent to said opening and movable over it partly or wholly to close it, and means for holding the flap at the desired adjustment.

In testimony whereof I have signed my name to this specification in the presence of two subscribing witnesses.

GEORGE L. DALE.

Witnesses:
J. L. McAULIFFE,
EVERARD B. MARSHALL.